United States Patent
Liu et al.

(10) Patent No.: US 12,200,550 B2
(45) Date of Patent: Jan. 14, 2025

(54) HANDOVER METHOD, HANDOVER DEVICE, AND NETWORK SYSTEM

(71) Applicant: ZTE Corporation, Shenzhen (CN)

(72) Inventors: Zhuang Liu, Shenzhen (CN); Yin Gao, Shenzhen (CN); Jiren Han, Shenzhen (CN); Jiajun Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/768,524

(22) PCT Filed: Nov. 2, 2020

(86) PCT No.: PCT/CN2020/125871
§ 371 (c)(1),
(2) Date: Apr. 13, 2022

(87) PCT Pub. No.: WO2021/088766
PCT Pub. Date: May 14, 2021

(65) Prior Publication Data
US 2024/0114402 A1 Apr. 4, 2024

(30) Foreign Application Priority Data
Nov. 8, 2019 (CN) .......................... 201911089575.4

(51) Int. Cl.
*H04W 36/00* (2009.01)
*H04W 36/30* (2009.01)
(52) U.S. Cl.
CPC ... *H04W 36/0061* (2013.01); *H04W 36/0083* (2013.01); *H04W 36/304* (2023.05)

(58) Field of Classification Search
None
See application file for complete search history.

(56) References Cited

U.S. PATENT DOCUMENTS

| | | | |
|---|---|---|---|
| 8,509,135 B2 | 8/2013 | Kwun | |
| 9,432,901 B1 | 8/2016 | Kwan | |

(Continued)

FOREIGN PATENT DOCUMENTS

| | | | |
|---|---|---|---|
| CN | 101765153 A | 6/2010 | |
| CN | 102665259 A | 9/2012 | |

(Continued)

OTHER PUBLICATIONS

International Search Report for corresponding application PCT/CN2020/125871 filed Nov. 2, 2020; Mail date Feb. 3, 2021.

(Continued)

*Primary Examiner* — Kenneth B Wells
(74) *Attorney, Agent, or Firm* — CANTOR COLBURN LLP

(57) ABSTRACT

Provided are a handover method, a handover device, and a network system. The handover method includes: receiving cell information of a second cell sent by a second network element, wherein the second cell is a cell managed by the second network element, and the cell information includes predicted cell load information of the second cell; and sending a handover instruction to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold.

20 Claims, 5 Drawing Sheets

---

Receive cell information of a second cell sent by a second network element, wherein the second cell is a cell managed by the second network element, and the cell information includes predicted cell load information — S202

In a case where the cell information satisfies a preset condition, send a handover instruction to a terminal, wherein the handover instruction is used for instructing terminal to perform handover to the second cell, and the case where the cell information satisfies the preset condition indicates that the predicted cell load information is lower than a configured first threshold — S204

(56) References Cited

U.S. PATENT DOCUMENTS

| | | | | |
|---|---|---|---|---|
| 10,869,248 | B1* | 12/2020 | Oroskar | H04W 36/22 |
| 11,146,990 | B1* | 10/2021 | Marupaduga | H04B 7/15528 |
| 2009/0163223 | A1* | 6/2009 | Casey | H04W 36/22 |
| | | | | 455/453 |
| 2013/0294272 | A1* | 11/2013 | Xiao | H04W 52/0206 |
| | | | | 370/252 |
| 2016/0183147 | A1* | 6/2016 | Da Silva | H04W 36/22 |
| | | | | 370/331 |
| 2017/0367024 | A1* | 12/2017 | Chiba | H04W 24/02 |
| 2018/0132145 | A1 | 5/2018 | Cao et al. | |
| 2019/0261267 | A1 | 8/2019 | MacKenzie et al. | |
| 2021/0084559 | A1* | 3/2021 | Chaponniere | H04W 36/08 |

FOREIGN PATENT DOCUMENTS

| | | | |
|---|---|---|---|
| CN | 103763747 | A | 4/2014 |
| CN | 107396376 | A | 11/2017 |
| CN | 111083753 | A | 4/2020 |
| CN | 111093236 | A | 5/2020 |
| EP | 2549803 | A2 | 1/2013 |
| EP | 3122099 | A1 | 1/2017 |
| WO | 2014161896 | A1 | 10/2014 |

OTHER PUBLICATIONS

European Search Report for corresponding application EP20884326; Mail date Sep. 7, 2022.

* cited by examiner

Fig. 3

Send cell information of a second cell to a first network element, wherein the second cell is a cell managed by the second network element, and the cell information includes predicted cell load information of the second cell, the cell information is used for instructing the first network element to send a handover instruction to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold ⌒ S301

Fig. 4

Receiving a handover instruction sent by a first network element, wherein the handover instruction is sent by the first network element in a case where cell information satisfies a preset condition, the cell information is cell information of a second cell sent by the second network element, the second cell is a cell managed by the second network element, the cell information includes predicted cell load information of the second cell, and the case where the cell information satisfies the preset condition at least indicates that the predicted cell load information of the second cell is lower than a configured first threshold ⌒ S402

Perform handover to the second cell according to the handover instruction ⌒ S404

Fig. 5

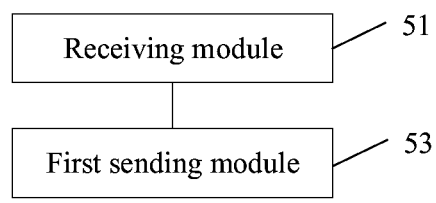

HANDOVER METHOD, HANDOVER DEVICE, AND NETWORK SYSTEM

The present disclosure is a National Stage Filing of PCT International Application No. PCT/CN2020/125871 filed on Nov. 2, 2020, which claims priority to Chinese Patent Application No. 201911089575.4, filed with the China National Intellectual Property Administration on Nov. 8, 2019, the present disclosure of which is incorporated herein by reference in its entirety.

TECHNICAL FIELD

The present disclosure relates to the field of communications, and for example, to a handover method, a handover device, and a network system.

BACKGROUND

In a 5th Generation (5G) mobile communication system, a 5G base station is referred to as a New Generation Radio Access Network Node (NG RAN Node, also short as gNB). An interface between different gNBs is referred to as an Xn interface, and an interface between the gNB and a non-5G base station is referred to as an X2 interface. In addition, the 5G base station supports CU/DU split architecture. A split 5G base station may be divided into two parts: a gNB Centralized Unit (gNB-CU) and a gNB Distributed Unit (gNB-DU). Only one gNB-CU, serving as a centralized control node, is provided inside a split 5G base station. One gNB-CU may be connected to and manage multiple gNB-DUs. One gNB-DU is connected to one gNB-CU via an F1 interface.

In the related art, a cell of a wireless network may evaluate some information, such as a Physical Resource block (PRB) utilization rate of the cell, to evaluate a cell load. Network services may be affected in a case where the cell load is unbalanced. For example, in a case where the load of some cells is relatively high, the service quality of the cells may be reduced; and in a case where the load of some cells is relatively low, resource waste and power waste may also be caused. Furthermore, the load fluctuation of a cell is generally large, which makes it difficult to keep the cell load in a balanced state.

For the problem in the related art that loads of cells are unbalanced and thus influence network services, there is no solution proposed yet.

SUMMARY

Embodiments of the present disclosure provide a handover method, a handover device, and a network system.

According to some embodiments of the present disclosure, provided is a handover method, which can be applied to a first network element. The method includes: receiving cell information of a second cell sent by a second network element, wherein the second cell is a cell managed by the second network element, and the cell information includes predicted cell load information of the second cell; and sending a handover instruction to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold.

According to some other embodiments of the present disclosure, also provided is a handover method, which can be applied to a second network element. The method includes: sending cell information of a second cell to a first network element, wherein the second cell is a cell managed by the second network element, the cell information includes predicted cell load information of the second cell, the cell information is used for instructing the first network element to send a handover instruction to a terminal in a case where the cell information satisfies a preset condition, the handover instruction is used for instructing the terminal to perform handover to the second cell, and the case where the cell information satisfies the preset condition at least indicates that the predicted cell load information of the second cell is lower than a configured first threshold.

According to still another embodiment the present disclosure, also provided is a handover method, which can be applied to a terminal. The method includes: receiving a handover instruction sent by a first network element, wherein the handover instruction is sent by the first network element in a case where cell information satisfies a preset condition, the cell information is cell information of a second cell sent by a second network element, the second cell is a cell managed by the second network element, the cell information includes predicted cell load information of the second cell, and the case where the cell information satisfies the preset condition at least indicates that the predicted cell load information of the second cell is lower than a configured first threshold; and performing handover to the second cell according to the handover instruction.

According to some other embodiments of the present disclosure, also provided is a handover device. The handover device includes: a receiving module, configured to receive cell information of a second cell sent by a second network element, wherein the second cell is a cell managed by the second network element, and the cell information includes predicted cell load information of the second cell; and a first sending module, configured to send a handover instruction to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold.

According to some other embodiments of the present disclosure, also provided is a handover device. The handover device includes: a sending module, configured to send cell information of a second cell to a first network element, wherein the second cell is a cell managed by the second network element, the cell information includes predicted cell load information of the second cell, the cell information is used for instructing the first network element to send a handover instruction to a terminal in a case where the cell information satisfies a preset condition, the handover instruction is used for instructing the terminal to perform handover to the second cell, and the case where the cell information satisfies the preset condition at least indicates that the predicted cell load information of the second cell is lower than a configured first threshold.

According to some other embodiments of the present disclosure, also provided is a handover device. The handover device includes: a receiving module, configured to receive a handover instruction sent by a first network element, wherein the handover instruction is sent by the first network element in a case where cell information satisfies a preset condition, the cell information is cell information of a second cell sent by a second network element, the second cell is a cell managed by the second network element, the cell information includes predicted cell load information of the second cell, and the case where the cell information satisfies the preset condition at least indicates that the predicted cell load information of the second cell is lower than a configured first threshold; and a handover module, configured to perform handover to the second cell according to the handover instruction.

According to still another embodiment the present disclosure, also provided is a network system, including a first network element and a second network element. The second network element is configured to send cell information of a second cell to the first network element, wherein the second cell is a cell managed by the second network element, and the cell information includes predicted cell load information of the second cell. The first network element is configured to receive the cell information of the second cell sent by the second network element; and the first network element is further configured to send a handover instruction to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold.

According to some other embodiments of the present disclosure, also provided is a computer-readable storage medium. The computer-readable storage medium stores a computer program, wherein the computer program is configured to execute the operations in any one of the method embodiments at runtime.

According to some other embodiments of the present disclosure, also provided is an electronic device, including a memory and a processor, wherein the memory stores a computer program, and the processor is configured to run the computer program to execute the operations in any one of the method embodiments.

BRIEF DESCRIPTION OF THE DRAWINGS

Drawings, provided for further understanding of the present disclosure and forming a part of the description, are used to explain the present disclosure together with exemplary embodiments of the present disclosure, rather than to limit the present disclosure. In the drawings:

FIG. 3 is a flowchart of a handover method according to some other embodiments of the present disclosure;

FIG. 4 is a flowchart of a handover method according to some other embodiments of the present disclosure;

FIG. 5 is a structure diagram of a handover device according to some embodiments of the present disclosure;

DETAILED DESCRIPTION

Hereinafter, the present disclosure will be described with reference to the accompanying drawings and embodiments. It is important to note that the embodiments of the present disclosure and the characteristics in the embodiments can be combined under the condition of no conflicts.

It should be noted that, terms such as "first" and "second" in the description, claims, and accompanying drawings of the present disclosure are used to distinguish similar objects, but are not necessarily used to describe a specific sequence or order.

Figure 1:
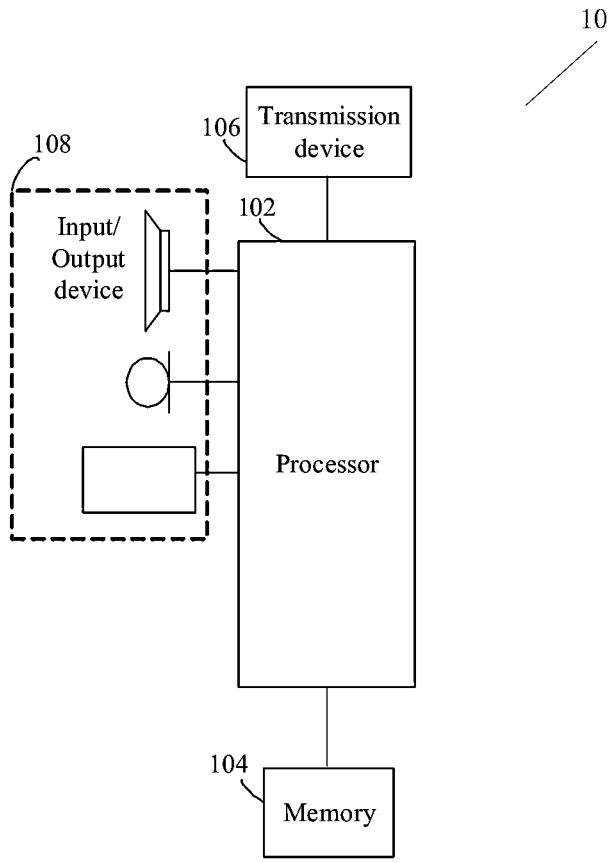
FIG. 1 is a hardware structural block diagram of a network element of a handover method according to some embodiments of the present disclosure.

The method embodiments of the present disclosure may be implemented in a network element, a computer terminal, or a similar computing device. Taking running on a network element as an example, FIG. 1 is a hardware structural block diagram of a network element of a handover method according to some embodiments of the present disclosure. As shown in FIG. 1, a network element 10 may include one or more (only one is shown in FIG. 1) processors 102 (the processors 102 may include, but are not limited to, a processing device such as a Microcontroller Unit (MCU) or a Field Programmable Gate Array (FPGA)) and a memory 104 for storing data. In some exemplary implementations, the network element may further include a transmission device 106 for a communication function and an input/output device 108. A person having ordinary skill in the art can understand that the structure shown in FIG. 1 is merely exemplary, and does not limit the structure of the foregoing network element. For example, the network element 10 may also include more or fewer components than shown in FIG. 1, or have a different configuration than shown in FIG. 1.

The memory 104 may be configured to store a computer program, for example, a software program and a module of application software, such as a computer program corresponding to the handover method in the embodiments of the present disclosure. The processor 102 runs the computer program stored in the memory 104 to execute various function applications and data processing, that is, to implement the foregoing method. The memory 104 may include high-speed random access memory, and may also include non-volatile memory, such as one or more magnetic storage devices, flash memory, or other non-volatile solid-state memory. In some examples, the memory 104 may further include at least one memory remotely located with respect to the processor 102, which may be connected to the network element 10 over a network. Examples of such network includes, but is not limited to, the Internet, intranet, local area network, mobile communication network, and combinations thereof.

The transmission device 106 is configured to receive or send data via a network. Examples of the above-described network may include a wireless network provided by a communication provider of the network element 10. In one example, the transmission device 106 may include a Network Interface Controller (NIC) that may be coupled to other network devices via a base station to communicate with the Internet. In one example, the transmission device 106 may be a Radio Frequency (RF) module for communicating wirelessly with the Internet.

The embodiments of the present disclosure can run on a network architecture that includes: a first network element, a second network element and a terminal. The first network element and the second network element can perform information interaction with each other. The first network element and the second network element can also respectively perform information interaction with the terminal. The terminal can also respectively perform information interaction with the first network element and the second network element.

Figure 2:
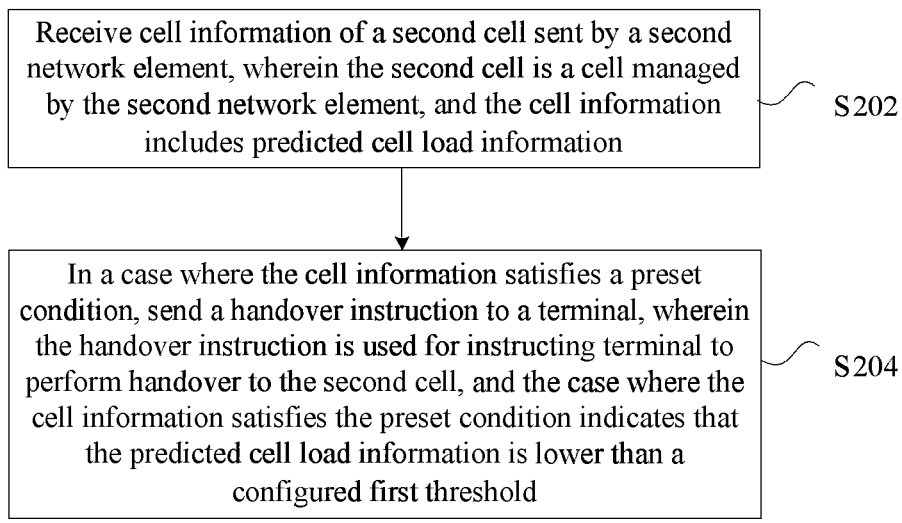
FIG. 2 is a flowchart of a handover method according to some embodiments of the present disclosure.

The embodiments provide a handover method running on the described network element. FIG. 2 is a flowchart of a handover method according to some embodiments of the present disclosure. The handover method may be applied to a first network element. As shown in FIG. 2, the flow includes the following operations.

At S202, cell information of a second cell sent by a second network element is received, wherein the second cell is a cell managed by the second network element, and the cell information includes predicted cell load information of the second cell.

At S204, a handover instruction is sent to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold.

By means of the described operations, a first network element receives cell information of a second cell sent by a second network element, wherein the second cell is a cell managed by the second network element, and the cell information includes predicted cell load information of the second cell; and in a case where the cell information satisfies a preset condition, a handover instruction is sent to a terminal, wherein the handover instruction is used for instructing the terminal to perform handover to the second cell, and the case where the cell information satisfies the preset condition at least indicates that the predicted cell load information of the second cell is lower than a configured first threshold. The scheme solves the problem in the related art that loads of cells are unbalanced and thus influence network services, and improves the quality of the network services.

In some exemplary implementations, the foregoing operations may be, but are not limited to be, executed by a base station.

In some exemplary implementations, before the handover instruction is sent to the terminal, the method may further include: it is determined that current cell load information of a first cell is higher than a configured second threshold; or it is determined that current cell load information of a first cell is lower than a configured third threshold. The first cell is a cell where the terminal is currently located.

In some exemplary implementations, after it is determined that the current cell load information of the first cell is lower than the configured third threshold, the operation that the handover instruction is sent to the terminal in a case where the cell information satisfies the preset condition includes: the handover instruction is sent to the terminal in a case where the cell information satisfies the preset condition, wherein the case where the cell information satisfies the preset condition further indicates that the second cell and the first cell have the same coverage, the cell information further includes cell coverage information, and the cell coverage information is used for indicating an overlapped coverage relationship between the second cell and the first cell.

In some exemplary implementations, after the terminal performs handover to the second cell, the method further includes: the first cell is switched off.

In some exemplary implementations, the operation that the first cell is switched off includes at least one of: switching off the entire first cell, switching off all or part of carriers of the first cell, switching off all or part of radio frequency channels of the first cell, and switching off all or part of symbol resources of the first cell.

In some exemplary implementations of the embodiments, the predicted cell load information is used for indicating a predicted average load condition of the second cell within a specified time period after a current time, and the predicted cell load information includes at least one of: cell power consumption, cell radio resource consumption, cell hardware load, and cell beam load.

In some exemplary implementations, before the cell information sent by the second network element is received, the method may further include: a request message is sent to the second network element, wherein the request message carries a report indicator, and the report indicator is used for instructing the second network element to send the cell information.

In some exemplary implementations, the handover instruction is radio resource control signaling.

The embodiments also provide a handover method, which may be applied to a second network element. FIG. 3 is a flowchart of a handover method according to some other embodiments of the present disclosure. As shown in FIG. 3, the method includes the following operations.

At S301, cell information of a second cell is sent to a first network element, wherein the second cell is a cell managed by the second network element, the cell information includes predicted cell load information of the second cell, the cell information is used for instructing the first network element to send a handover instruction to a terminal in a case where the cell information satisfies a preset condition, the handover instruction is used for instructing the terminal to perform handover to the second cell, and the case where the cell information satisfies the preset condition at least indicates that the predicted cell load information of the second cell is lower than a configured first threshold.

By means of the described operations, a second network element sends cell information of a second cell to a first network element, wherein the second cell is a cell managed by the second network element, the cell information includes predicted cell load information of the second cell, the cell information is used for instructing the first network element to send a handover instruction to a terminal in a case where the cell information satisfies a preset condition, the handover instruction is used for instructing the terminal to perform handover to the second cell, and the case where the cell information satisfies the preset condition at least indicates that the predicted cell load information of the second cell is lower than a configured first threshold. Therefore, the problem in the related art that loads of cells are unbalanced and thus influence network services is solved, and the quality of the network services is improved.

In some exemplary implementations, the cell information is further used for instructing the first network element to determine, before sending the handover instruction to the terminal, that current cell load information of a first cell is higher than a configured second threshold, wherein the first cell is a cell where the terminal is currently located; or the cell information is further used for instructing the first network element to determine, before sending the handover instruction to the terminal, that current cell load information of a first cell is lower than a configured third threshold, wherein the first cell is a cell where the terminal is currently located.

In some exemplary implementations, the cell information is further used for instructing the first network element to send the handover instruction to the terminal in a case where the cell information satisfies the preset condition after determining that the current cell load information of the first cell is lower than the configured third threshold, and the case where the cell information satisfies the preset condition further indicates that the second cell and the first cell have the same coverage, the cell information further includes cell coverage information, and the cell coverage information is used for indicating an overlapped coverage relationship between the second cell and the first cell.

In some exemplary implementations, the cell information is further used for instructing the first network element to switch off the first cell after sending the handover instruction to the terminal.

In some exemplary implementations, switching off the first cell includes at least one of switching off the entire first cell, switching off all or part of carriers of the first cell, switching off all or part of radio frequency channels of the first cell, and switching off all or part of symbol resources of the first cell.

In some exemplary implementations, the predicted cell load information is used for indicating a predicted average load condition of the second cell within a specified time period after a current time, and the predicted cell load information includes at least one of cell power consumption, cell radio resource consumption, cell hardware load, and cell beam load.

In some exemplary implementations, before the cell information of the second cell is sent to the first network element, the method may further include: a request message sent by the first network element is received, wherein the request message carries a report indicator, and the report indicator is used for instructing the second network element to send the cell information.

In some exemplary implementations, the handover instruction may be radio resource control signaling.

The embodiments also provide a handover method, which may be applied to a terminal. FIG. 4 is a flowchart of a handover method according to some other embodiments of the present disclosure. As shown in FIG. 4, the method includes the following operations.

At S402, a handover instruction sent by a first network element is received, wherein the handover instruction is sent by the first network element in a case where cell information satisfies a preset condition, the cell information is cell information of a second cell sent by a second network element, the second cell is a cell managed by the second network element, the cell information includes predicted cell load information of the second cell, and the case where the cell information satisfies the preset condition at least indicates that the predicted cell load information of the second cell is lower than a configured first threshold.

At S404, the terminal performs handover to the second cell according to the handover instruction.

By means of the described operations, a terminal receives a handover instruction sent by a first network element, wherein the handover instruction is sent by the first network element in a case where cell information satisfies a preset condition, the cell information is cell information of a second cell sent by a second network element, the second cell is a cell managed by the second network element, the cell information includes predicted cell load information of the second cell, and the case where the cell information satisfies the preset condition at least indicates that the predicted cell load information of the second cell is lower than a configured first threshold; and the terminal performs handover to the second cell according to the handover instruction. The scheme solves the problem in the related art that loads of cells are unbalanced and thus influence network services, and improves the quality of the network services.

In some exemplary implementations, the handover instruction is sent by the first network element in a case where the first network element determines that current cell load information of a first cell is higher than a configured second threshold, wherein the first cell is a cell where the terminal is currently located; or, the handover instruction is sent by the first network element in a case where the first network element determines that current cell load information of a first cell is lower than a configured third threshold, wherein the first cell is a cell where the terminal is currently located.

In some exemplary implementations, in a case where the first network element determines that the current cell load information of the first cell is lower than the configured third threshold, the handover instruction is sent by the first network element also in a case where cell information of a second cell satisfies a preset condition, wherein the case where the cell information satisfies the preset condition also indicates that the second cell and the first cell have the same coverage. The cell information may further include cell coverage information, and the cell coverage information is used for indicating an overlapped coverage relationship between the second cell and the first cell.

In some exemplary implementations, the operation that the terminal performs handover to the second cell according to the handover instruction also triggers the first network element to switch off the first cell. In some exemplary implementations, switching off the first cell includes at least one of switching off the entire first cell, switching off all or part of carriers of the first cell, switching off all or part of radio frequency channels of the first cell, and switching off all or part of symbol resources of the first cell.

In some exemplary implementations, the predicted cell load information is used for indicating a predicted average load condition of the second cell within a specified time period after a current time, and the predicted cell load information includes at least one of cell power consumption, cell radio resource consumption, cell hardware load, and cell beam load.

In some exemplary implementations, the cell information is sent by the second network element after the second network element receives the request message sent by the first network element, wherein the request message carries a report indicator, and the report indicator is used for instructing the second network element to send the cell information.

In some exemplary implementations, the handover instruction is radio resource control signaling.

The embodiments also provide a handover device, which is configured to implement the described embodiments and exemplary implementations, and what has been described will not be elaborated. The term "module", as used hereinafter, is a combination of software and/or hardware that can implement a predetermined function. FIG. 5 is a structure diagram of a handover device according to some embodiments of the present disclosure. As shown in FIG. 5, the handover device includes: a receiving module 51, configured to receive cell information of a second cell sent by a second network element, wherein the second cell is a cell managed by the second network element, and the cell information includes predicted cell load information of the second cell; and a first sending module 53, configured to send a handover instruction to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold.

By means of the described modules, cell information of a second cell sent by a second network element is received, wherein the second cell is a cell managed by the second network element, and the cell information includes predicted cell load information of the second cell; and in a case where the cell information satisfies a preset condition, a handover instruction is sent to a terminal, wherein the handover instruction is used for instructing the terminal to perform handover to the second cell, and the case where the cell information satisfies the preset condition at least indicates that the predicted cell load information of the second cell is lower than a configured first threshold. The scheme solves the problem in the related art that loads of cells are unbalanced and thus influence network services, and improves the quality of the network services.

In some exemplary implementations, the device of the embodiments may further include: a first determining module, configured to, before the first sending module 53 sends the handover instruction to the terminal, determine that current cell load information of a first cell is higher than a configured second threshold; or a second determining module, configured to, before the first sending module 53 sends the handover instruction to the terminal, determine that current cell load information of a first cell is lower than a configured third threshold. The first cell is a cell where the terminal is currently located.

In some exemplary implementations, the first sending module 53 includes: a sending sub-module, configured to, after the second determining module determines that the current cell load information of the first cell is lower than the configured third threshold, send the handover instruction to the terminal in the case where the cell information satisfies the preset condition, wherein the cell information further includes cell coverage information, the cell coverage information is used for indicating an overlapped coverage relationship between the second cell and the first cell, and the case where the cell information satisfies the preset condition further indicates that the second cell and the first cell have the same coverage.

In some exemplary implementations, the device of the embodiments may further include: a switching-off module, configured to switch off the first cell after the sending sub-module sends the handover instruction to the terminal.

In some exemplary implementations, the switching-off module in the embodiments includes at least one of: a first switching-off sub-module, configured to switch off the entire first cell; a second switching-off sub-module, configured to switch off all or part of carriers of the first cell; a third switching-off sub-module, configured to switch off all or part of radio frequency channels of the first cell; and a fourth switching-off sub-module, configured to switch off all or part of symbol resources of the first cell.

In some exemplary implementations, the predicted cell load information in the embodiments is used for indicating a predicted average load condition of the second cell within a specified time period after a current time, and the predicted cell load information includes at least one of: cell power consumption, cell radio resource consumption, cell hardware load, and cell beam load.

In some exemplary implementations, the device of the embodiments may further include: a second sending module, configured to send a request message to the second network element before the receiving module receives the cell information sent by the second network element, wherein the request message carries a report indicator, and the report indicator is used for instructing the second network element to send the cell information.

Figure 6:
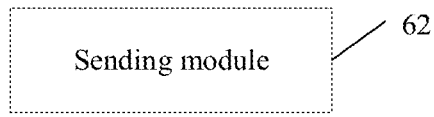
FIG. 6 is a structure diagram of a handover device according to some other embodiments of the present disclosure.

The embodiments also provide a handover device, which is configured to implement the described embodiments and exemplary implementations, and what has been described will not be elaborated. The term "module", as used hereinafter, is a combination of software and/or hardware that can implement a predetermined function. FIG. 6 is a structure diagram of a handover device according to some other embodiments of the present disclosure. As shown in FIG. 6, the handover device includes: a sending module 62, configured to send cell information of a second cell to a first network element, wherein the second cell is a cell managed by the second network element, the cell information includes predicted cell load information of the second cell, the cell information is used for instructing the first network element to send a handover instruction to a terminal in a case where the cell information satisfies a preset condition, the handover instruction is used for instructing the terminal to perform handover to the second cell, and the case where the cell information satisfies the preset condition at least indicates that the predicted cell load information of the second cell is lower than a configured first threshold.

By means of the described modules, cell information of a second cell is sent to a first network element, wherein the second cell is a cell managed by the second network element, the cell information includes predicted cell load information of the second cell, the cell information is used for instructing the first network element to send a handover instruction to a terminal in a case where the cell information satisfies a preset condition, the handover instruction is used for instructing the terminal to perform handover to the second cell, and the case where the cell information satisfies the preset condition at least indicates that the predicted cell load information of the second cell is lower than a configured first threshold. The problem in the related art that loads of cells are unbalanced and thus influence network services is solved, and the quality of the network services is improved.

In some exemplary implementations, the cell information is further used for instructing the first network element to determine, before sending the handover instruction to the terminal, that current cell load information of a first cell is higher than a configured second threshold, wherein the first cell is a cell where the terminal is currently located; or the cell information is further used for instructing the first network element to determine, before sending the handover instruction to the terminal, that current cell load information of a first cell is lower than a configured third threshold, wherein the first cell is a cell where the terminal is currently located.

In some exemplary implementations, the cell information is further used for instructing the first network element to send the handover instruction to the terminal in a case where the cell information satisfies the preset condition after determining that the current cell load information of the first cell is lower than the configured third threshold, and the case where the cell information satisfies the preset condition further indicates that the second cell and the first cell have the same coverage, the cell information further includes cell coverage information, and the cell coverage information is used for indicating an overlapped coverage relationship between the second cell and the first cell.

In some exemplary implementations, the cell information is further used for instructing the first network element to switch off the first cell after sending the handover instruction to the terminal. In some exemplary implementations, switching off the first cell includes at least one of switching off the entire first cell, switching off all or part of carriers of the first cell, switching off all or part of radio frequency channels of the first cell, and switching off all or part of symbol resources of the first cell. In some exemplary implementations, the predicted cell load information is used for indicating a predicted average load condition of the second cell within a specified time period after a current time, and the predicted cell load information includes at least one of: cell power consumption, cell radio resource consumption, cell hardware load, and cell beam load. In some exemplary implementations, the handover instruction may be radio resource control signaling.

In some exemplary implementations, the device of the embodiments may further include: a receiving module, configured to receive, before the cell information of the second cell is sent to the first network element, a request message sent by the first network element, wherein the request message carries a report indicator, and the report indicator is used for instructing the second network element to send the cell information.

Figure 7:
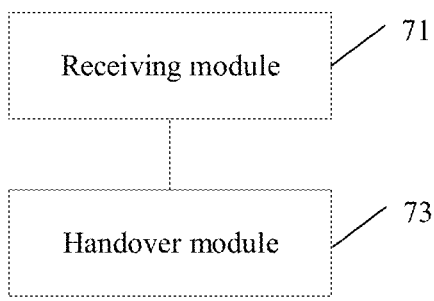
FIG. 7 is a structure diagram of a handover device according to some other embodiments of the present disclosure.

The embodiments also provide a handover device, which is configured to implement the described embodiments and exemplary implementations, and what has been described will not be elaborated. The term "module", as used hereinafter, is a combination of software and/or hardware that can implement a predetermined function. FIG. 7 is a structure diagram of a handover device according to some other embodiments of the present disclosure. As shown in FIG. 7, the handover device includes: a receiving module 71, configured to receive a handover instruction sent by a first network element, wherein the handover instruction is sent by the first network element in a case where cell information satisfies a preset condition, the cell information is cell information of a second cell sent by a second network element, the second cell is a cell managed by the second network element, the cell information includes predicted cell load information of the second cell, and the case where the cell information satisfies the preset condition at least indicates that the predicted cell load information of the second cell is lower than a configured first threshold; and a handover module 73, configured to perform handover to the second cell according to the handover instruction.

By means of the described modules, a handover instruction sent by a first network element is received, wherein the handover instruction is sent by the first network element in a case where cell information satisfies a preset condition, the cell information is cell information of a second cell sent by a second network element, the second cell is a cell managed by the second network element, the cell information includes predicted cell load information of the second cell, and the case where the cell information satisfies the preset condition at least indicates that the predicted cell load information of the second cell is lower than a configured first threshold; and the handover device performs handover to the second cell according to the handover instruction. The scheme solves the problem in the related art that loads of cells are unbalanced and thus influence network services, and improves the quality of the network services.

In some exemplary implementations, the handover instruction is sent by the first network element in a case where the first network element determines that current cell load information of a first cell is higher than a configured second threshold, wherein the first cell is a cell where the terminal is currently located; or, the handover instruction is sent by the first network element in a case where the first network element determines that current cell load information of a first cell is lower than a configured third threshold, wherein the first cell is a cell where the terminal is currently located.

In some exemplary implementations, in a case where the first network element determines that the current cell load information of the first cell is lower than the configured third threshold, the handover instruction is sent by the first network element also in a case where cell information of a second cell satisfies a preset condition, wherein the case where the cell information satisfies the preset condition also indicates that the second cell and the first cell have the same coverage. The cell information may further include cell coverage information, and the cell coverage information is used for indicating an overlapped coverage relationship between the second cell and the first cell.

In some exemplary implementations, the cell information is sent by the second network element after the second network element receives the request message sent by the first network element, wherein the request message carries a report indicator, and the report indicator is used for instructing the second network element to send the cell information.

In some exemplary implementations, the operation that the terminal performs handover to the second cell according to the handover instruction also triggers the first network element to switch off the first cell. In some exemplary implementations, switching off the first cell includes at least one of switching off the entire first cell, switching off all or part of carriers of the first cell, switching off all or part of radio frequency channels of the first cell, and switching off all or part of symbol resources of the first cell. In some exemplary implementations, the predicted cell load information is used for indicating a predicted average load condition of the second cell within a specified time period after a current time, and the predicted cell load information includes at least one of: cell power consumption, cell radio resource consumption, cell hardware load, and cell beam load. In some exemplary implementations, the handover instruction is radio resource control signaling.

The embodiments also provide a network system, including a first network element and a second network element. The second network element is configured to send cell information of a second cell to the first network element, wherein the second cell is a cell managed by the second network element, and the cell information includes predicted cell load information of the second cell. The first network element is configured to receive the cell information of the second cell sent by the second network element. The first network element is further configured to send a handover instruction to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold.

In some exemplary implementations, the first network element, the second network element, and the terminal in the embodiments are further configured to perform the operations in any one of the foregoing embodiments, which are not further described herein.

It should be noted that each module may be implemented by software or hardware. The latter may be implemented in the following manner, but is not limited thereto. All the modules are located in a same processor; alternatively, the modules are located in different processors in an arbitrary combination.

Exemplary Implementations

The present embodiment relates to the technical field of wireless communication systems, and for example, to a communication method based on load prediction. The introduction of Artificial Intelligence (AI) and Machine Learning Technology in a wireless network can better predict future network load, which can be used for network communication management decision.

In the present embodiment, some information of a cell in a wireless network may be evaluated, for example, a cell load can be evaluated according to a Physical Resource Block (PRB) utilization rate condition of the cell. In a case where it is determined that a serving cell is in a high-load state, load balancing is executed, and some users are handed over to an adjacent low-load cell. A cell load state of the adjacent cell can be acquired via an X2/XN interface. Furthermore, a more appropriate target cell to be handed over may be selected according to the load information of the relevant adjacent cells during handover. The evaluated cell load of a current cell can also be used to save energy. For example, in a case where the load of the current cell is very low, then the current cell can be switched off to save electric energy, and the remaining users of the current cell may be handed over to other low-load adjacent cells. Since the load of the entire network varies in real time, for example, a relatively large change may occur at a following time point, or some loads may have a periodic characteristic, the decision of handover/energy saving and/or load balancing merely according to current load information is not sufficient, which may result in that after a user is handed over to a new target cell, the subsequent load of the target cell increases rapidly, and the target cell cannot meet the user service quality. Hence, the target cell to which the user is handed over can be determined according to the predicted load, and the predicted load information in the cell information is used for indicating average load information of a certain cell managed on the predicted target network element in the next time period or multiple time periods in the future. Herein, the time period may be several seconds, several minutes, several hours or other time granularities. The load information may be indicated by one or more of the following: power consumption; radio resource consumption; hardware load; and beam load.

The handover method provided in the present embodiment includes the following operations. A source network element receives a message sent by a target network element, wherein the message includes cell auxiliary information. The source network element performs a connection management and energy saving operation according to the cell auxiliary information.

In some exemplary implementations, the cell auxiliary information includes at least one of predicted cell load information, which is used for indicating average load information of a certain cell managed on a predicted target network element in the next time period or multiple time periods in the future, wherein the time period may be several seconds, several minutes, several hours or other time granularities; and cell coverage information, which is used for indicating overlapped coverage relationships between cells on the target network element and between cells on the target network element and adjacent cells.

In some exemplary implementations, the predicted cell load of the target network element may be predicted in an artificial intelligence manner, and the load can be indicated by one or more of power consumption; radio resource consumption; hardware load; and beam load.

In some exemplary implementations, the source network element and the target network element may be base stations. The source base station receives a message A sent by one or more target base stations, and makes a handover decision according to cell auxiliary information included in the message A. The source base station selects, according to the predicted load information in the cell auxiliary information, a target cell on a target network element by using a judgement criterion of selecting a target cell with a low predicted load, and hands over some designated users of the current serving cell to the target cell.

In some exemplary implementations, the source network element may be a gNB-CU, and the target network element may be a gNB-DU. The gNB-CU receives a message B sent by one or more gNB-DUs of the current base station, and performs handover according to cell auxiliary information included in the message B. The gNB-CU selects, according to predicted load information in the cell auxiliary information, a target cell on a target network element by using a judgement criterion of taking-selecting a target cell with a low predicted load and hands over some designated users of the current serving cell to the target cell.

In some exemplary implementations, the source network element and the target network element may be base stations. The source base station receives a message A sent by one or more target base stations. The source base station performs an energy saving operation according to load information of a certain designated serving cell of the current base station and according to cell auxiliary information included in the message A. For example, in a case where the load information of a certain serving cell of the source base station is currently lower than a certain threshold, and there is a target cell to which the target base station belongs, then the predicted load of the target cell being lower than a certain threshold is used as one of judgement criteria. In some exemplary implementations, according to cell coverage information in the cell auxiliary information in the message A, the source network element determines to switch off the current designated serving cell for energy saving by taking the target cell and the current serving cell having the same coverage as one of the judgement criteria, and hands over users of the current serving cell to the target cell. The operation of switching off the serving cell may be switching off the entire cell, switching off a part of carriers in the cell, switching off a part of radio frequency channels in the cell, or switching off a part of symbol resources in the cell.

In some exemplary implementations, the source network element may be a gNB-CU, and the target network element may be a gNB-DU. The gNB-CU receives a message B sent by one or more gNB-DUs of a current base station. The gNB-CU performs an energy saving operation according to load information of a certain designated serving cell of the current base station and according to cell auxiliary information included in the message B. For example, in a case where load information of a certain serving cell of the base station to which the gNB-CU belongs is lower than a certain threshold, and there is a target cell to which a target gNB-DU belongs, then the predicted load of the target cell being lower than a certain threshold is used as one of judgement criteria. In some exemplary implementations, the target cell needs to have the same coverage as a current serving cell according to a cell coverage relationship in the cell auxiliary information, and the gNB-CU switches off the current designated serving cell for energy saving, and hands over users of the current serving cell to the target cell. The operation of switching off the serving cell may be switching off the entire cell, switching off a part of carriers in the cell, switching off a part of radio frequency channels in the cell, or switching off a part of symbol resources in the cell.

In some exemplary implementations, the source network element may send a message C to the target network element, wherein the message C includes a cell load reporting type indicator for indicating the target network element to include one or more of the following load information in the sent cell auxiliary information: current cell load information and predicted cell load information.

Exemplary Implementation 1

Figure 8:
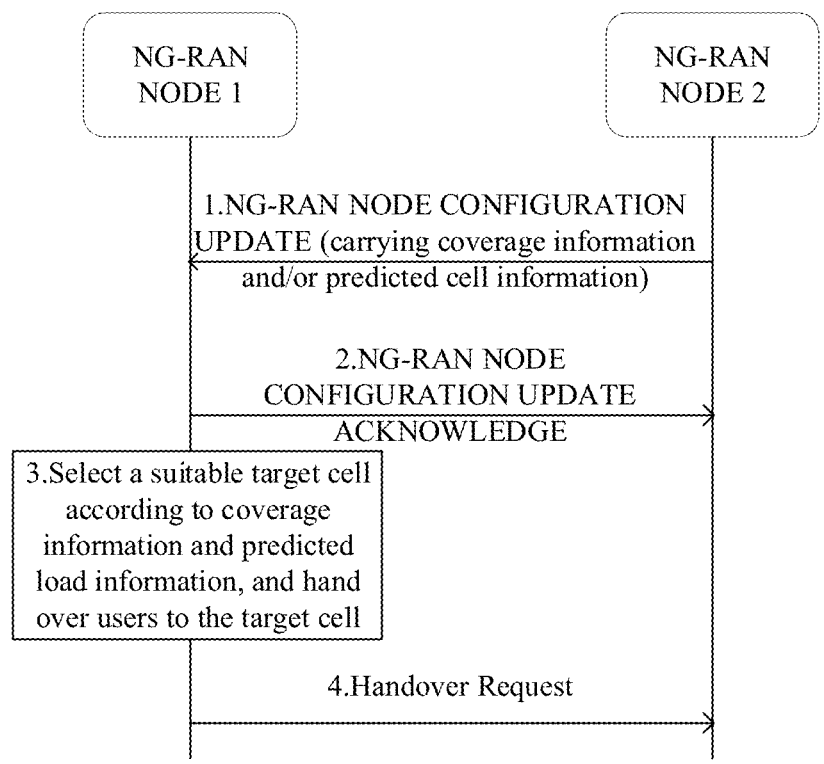
FIG. 8 is a flowchart of a handover method according to an exemplary implementation 1 of the present disclosure.

FIG. 8 is a flowchart of a handover method according to an exemplary implementation 1 of the present disclosure. As shown in FIG. 8, the handover method includes the following operations.

At operation 1, a target RAN node 2 sends a node configuration update message to a source RAN node 1, wherein cell auxiliary information of cells managed by the RAN node 2 is carried in the node configuration update message, and the cell auxiliary information includes at least one of: predicted cell load information used for indicating predicted average load information of a certain cell managed on the target network element at a next time period or multiple time periods in the future, wherein the time period may be several seconds, several minutes, several hours or other time granularities; and cell coverage information used for indicating overlapped coverage relationships between cells on a target network element and between cells on the target network element and adjacent cells. The predicted cell load may be predicted in an artificial intelligence manner, and the load may be indicated by one or more of: power consumption; radio resource consumption; hardware load; and beam load.

At operation 2, the source RAN node 1 sends a node configuration update acknowledge message to the target RAN node 2. In some exemplary implementations, the node configuration update acknowledge message may carry a cell load reporting type indicator for indicating which one of the current load information of the cell or the predicted load information of the cell is to be carried in the cell auxiliary information when the target network element sends the cell auxiliary information, and the target network element may re-send the node configuration update message to the source RAN node 1 according to the cell load reporting type indicator, wherein the load type information expected by the source network element is carried in the node configuration update message.

At operation 3, the source RAN node 1 makes a handover decision according to the cell auxiliary information included in the node configuration update message. The source RAN node 1 selects, according to the predicted load information in the cell auxiliary information and using a judgement criterion of selecting a target cell with a low predicted load, a target cell on the RAN node 2, and hands over some designated users of the current serving cell to the target cell.

At operation 4, the source RAN node 1 initiates a handover request to the target network element.

Exemplary Implementation 2

Figure 9:
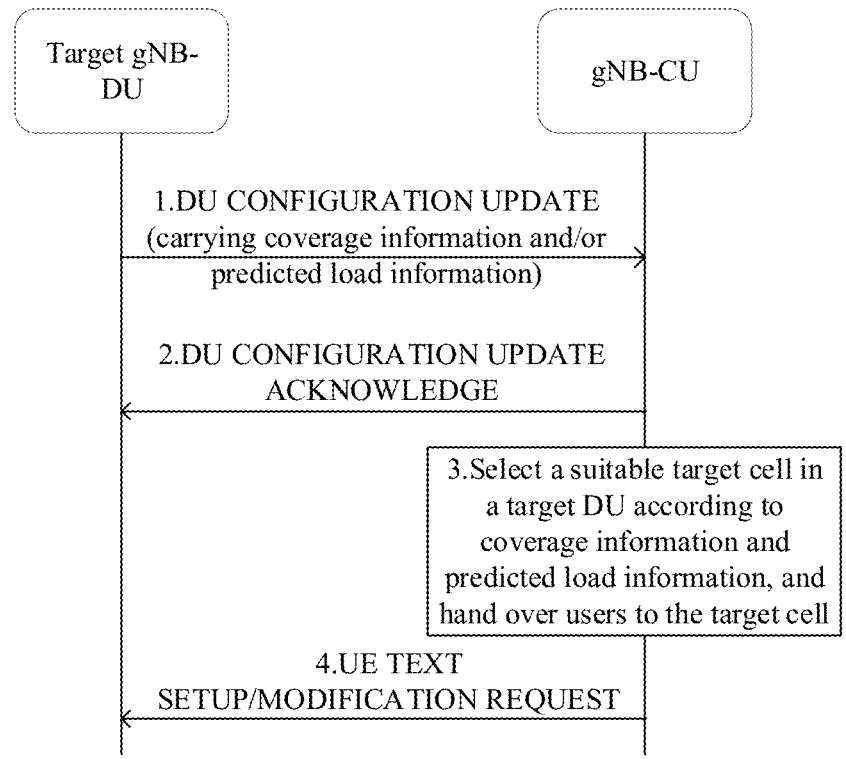
FIG. 9 is a flowchart of a handover method according to an exemplary implementation 2 of the present disclosure.

FIG. 9 is a flowchart of a handover method according to an exemplary implementation 2 of the present disclosure. As shown in FIG. 9, the handover method includes the following operations.

At operation 1, a target gNB-DU network element sends a DU configuration update message to a gNB-CU, wherein cell auxiliary information of a cell managed by the gNB-DU is carried in the node configuration update message, and the cell auxiliary information includes at least one of: predicted cell load information used for indicating predicted average load information of a certain cell managed on the target network element at a next time period in the future or multiple time periods in the future, wherein the time period may be several seconds, several minutes, several hours or other time granularity; and cell coverage information used for indicating overlapped coverage relationships between cells on a target network element and between cells on the target network element and adjacent cells. The predicted cell load may be predicted in an artificial intelligence manner, and the load may be indicated by one or more of: power consumption; radio resource consumption; hardware load; and beam load.

At operation 2, the source gNB-CU sends a DU configuration update acknowledge message to the target gNB-DU. In some exemplary implementations, the DU configuration update acknowledge message may carry a cell load reporting type indicator for indicating which one of the current load information of the cell or the predicted load information of the cell is to be carried in the cell auxiliary information when the target network element sends the cell auxiliary information, and the target network element may re-send the DU configuration update message to the gNB-CU according to the cell load reporting type indicator, wherein the load type expected by the source network element is carried in the DU configuration update message. In some exemplary implementations, the gNB-CU may send a CU configuration update message to the target gNB-DU, wherein the CU configuration update acknowledge message may carry a cell load reporting type indicator for indicating which one of the current load information of the cell or the predicted load information of the cell is to be carried in the cell auxiliary information when the target network element sends the cell auxiliary information, and the target network element may re-send the DU configuration update message to the gNB-CU according to the cell load reporting type indicator, wherein the load type expected by the source network element is carried in the DU configuration update message.

At operation 3, the source eNB-CU makes a handover decision according to the cell auxiliary information included in the node configuration update message. The source gNB-CU selects, according to predicted load information in the cell auxiliary information and using a judgement criterion of selecting a target cell with a low predicted load, a target cell on a gNB-DU, and hands over some designated users of the current serving cell to the target cell.

At operation 4, the source gNB-CU initiates a UE text setup or modification request to the target gNB-DU for handing over the users to the target cell.

Figure 10:
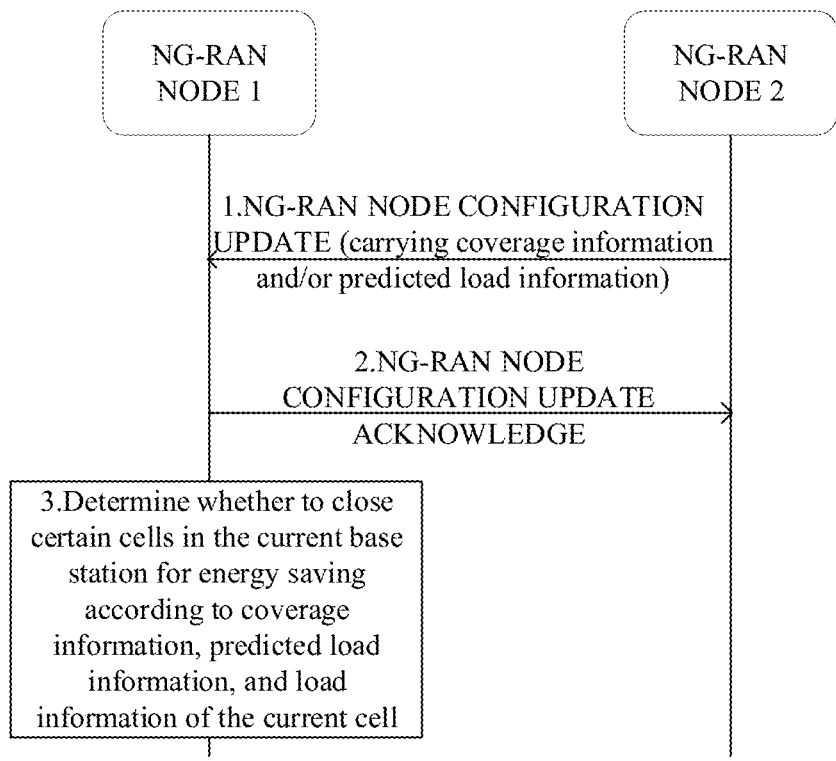
FIG. 10 is a flowchart of a handover method according to an exemplary implementation 3 of the present disclosure.

Exemplary implementation 3 FIG. 10 is a flowchart of a handover method according to an exemplary implementation 3 of the present disclosure. As shown in FIG. 10, the method includes the following operations.

At operation 1, a target RAN node 2 sends a node configuration update message to a source RAN node 1, wherein cell auxiliary information of cells managed by the RAN node 2 is carried in the node configuration update message, and the cell auxiliary information includes at least one of predicted cell load information used for indicating predicted average load information of a certain cell managed on the target network element at a next time period or multiple time periods in the future, wherein the time period may be several seconds, several minutes, several hours or other time granularities; and cell coverage information used for indicating overlapped coverage relationships between cells on a target network element and between cells on the target network element and adjacent cells. The predicted cell load may be predicted in an artificial intelligence manner, and the load may be indicated by one or more of: power consumption; radio resource consumption; hardware load; and beam load.

At operation 2, the source RAN node 1 sends a node configuration update acknowledge message to the target RAN node 2. In some exemplary implementations, the node configuration update acknowledge message may carry a cell load reporting type indicator for indicating which one of the current load information of the cell or the predicted load information of the cell is to be carried in the cell auxiliary information when the target network element sends the cell auxiliary information, and the target network element may re-send the node configuration update message to the source RAN node 1 according to the cell load reporting type indicator, wherein the load type information expected by the source network element is carried in the node configuration update message.

At operation 3, the source RAN node 1 receives a node configuration update acknowledge message sent by one or more target RAN nodes 2. The source RAN node 1 performs an energy saving operation according to load information of a certain designated serving cell of the current base station and according to cell auxiliary information included in the message. For example, in a case where load information of a certain serving cell of the source network element is lower than a certain threshold, and there is a target cell to which the target network element belongs, then the predicted load information of the target cell being lower than a certain threshold is taken as one of judgement criteria. In some exemplary implementations, in a case where the target cell has the same coverage as the current serving cell according to a cell coverage relationship in the cell auxiliary information, the source base station switches off the current designated serving cell for energy saving, and hands over users of the current serving cell to the target cell. The operation of switching off the serving cell may be switching off the entire cell, switching off a part of carriers in the cell, switching off a part of radio frequency channels in the cell, or switching off a part of symbol resources in the cell.

Exemplary Implementation 4

Figure 11:
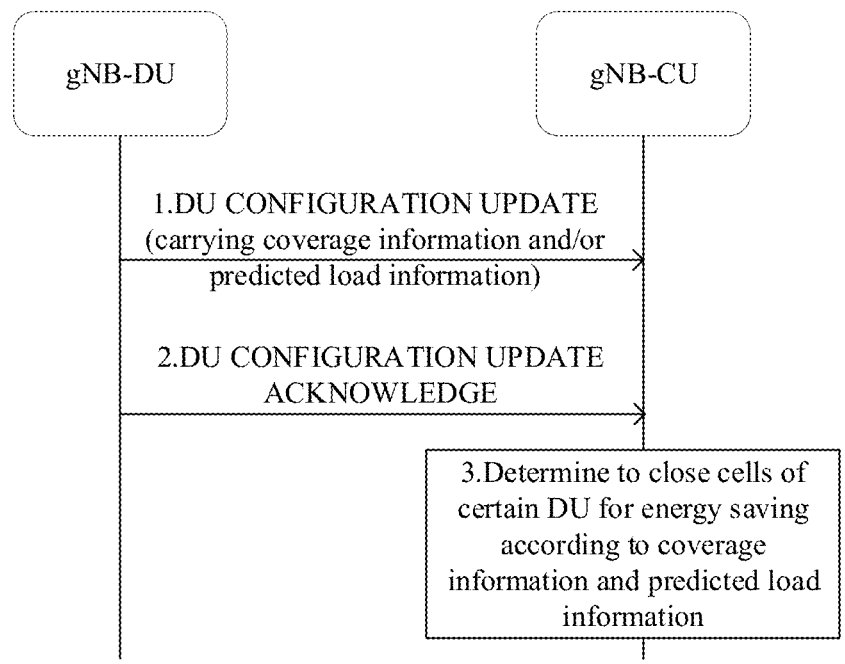
FIG. 11 is a flowchart of a handover method according to an exemplary implementation 4 of the present disclosure.

FIG. 11 is a flowchart of a handover method according to an exemplary implementation 4 of the present disclosure. As shown in FIG. 11, the method includes the following operations.

At operation 1, a target gNB-DU network element sends a DU configuration update message to a gNB-CU, wherein cell auxiliary information of a cell managed by the gNB-DU is carried in the node configuration update message, and the cell auxiliary information includes at least one of predicted cell load information used for indicating predicted average load information of a certain cell managed on the target network element at a next time period in the future or multiple time periods in the future, wherein the time period may be several seconds, several minutes, several hours or other time granularity; and cell coverage information used for indicating overlapped coverage relationships between cells on a target network element and between cells on the target network element and adjacent cells. The predicted cell load may be predicted in an artificial intelligence manner, and the load may be indicated by one or more of power consumption; radio resource consumption; and hardware load.

At operation 2, the source gNB-CU sends a DU configuration update acknowledge message to the target gNB-DU. In some exemplary implementations, the node configuration update acknowledge message may carry a cell load reporting type indicator for indicating which one of the current load information of the cell or the predicted load information of the cell is to be carried in the cell auxiliary information when the target network element sends the cell auxiliary information, and the target network element may re-send the DU configuration update message to the gNB-CU according to the cell load reporting type indicator, wherein the load type information expected by the source network element is carried in the DU configuration update message. In some exemplary implementations, the gNB-CU may send a CU configuration update message to the target gNB-DU, the CU configuration update acknowledge message may carry a cell load reporting type indicator for indicating which one of current load information of the cell or predicted load information of the cell is to be carried in the cell auxiliary information when the target network element sends the cell auxiliary information, and the target network element may re-send the DU configuration update message to the gNB-CU according to the cell load reporting type indicator, wherein load type information expected by the source network element is carried in the DU configuration update message.

At operation 3, the source gNB-CU receives a node configuration update acknowledge message sent by one or more target gNB-DUs, and the source gNB-CU performs an energy saving operation according to load information of a certain designated serving cell of a base station where the gNB-CU is located and according to cell auxiliary information included in the message. For example, in a case where the load information of a certain serving cell is lower than a certain threshold and there is a target cell to which the target network element belongs, the source gNB-CU takes the predicted load information of the target cell being lower than the certain threshold as one of the criteria. In some exemplary implementations, in a case where the target cell has the same coverage as the current serving cell according to a cell coverage relationship in the cell auxiliary information, the gNB-CU switches off the current designated serving cell for energy saving and hands over users of the current serving cell to the target cell. The operation of switching off the serving cell may be switching off the entire cell, switching off a part of carriers in the cell, switching off a part of radio frequency channels in the cell, or switching off a part of symbol resources in the cell.

Exemplary Implementation 5

Figure 12:
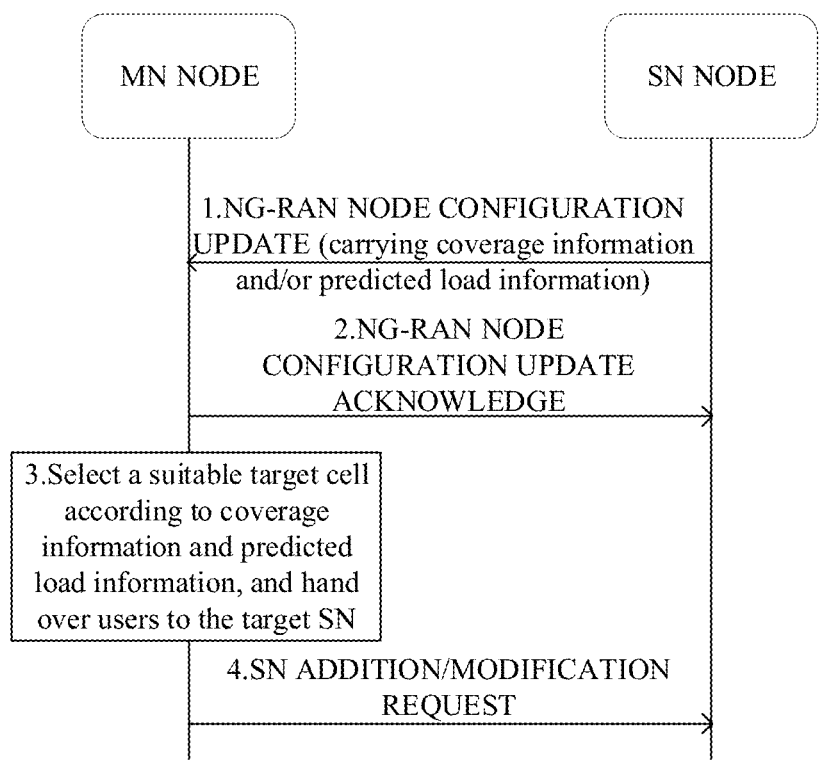
FIG. 12 is a flowchart of a handover method according to an exemplary implementation 5 of the present disclosure.

FIG. 12 is a flowchart of a handover method according to an exemplary implementation 5 of the present disclosure. As shown in FIG. 12, the method includes the following operations.

At operation 1, a target node (e.g., a secondary node (SN)) sends a node configuration update message to a source node (e.g., a master node (MN)), wherein the node configuration update message carries cell auxiliary information of a cell managed by the SN, and the cell auxiliary information includes at least one of: predicted cell load information used for indicating predicted average load information of a certain cell managed on a target network element in a next time period or multiple future time periods, wherein the time period may be several seconds, several minutes, several hours or other time granularities; and cell coverage information used for indicating overlapped coverage relationships between cells on a target network element and between cells on the target network element and adjacent cells. The predicted cell load may be predicted in an artificial intelligence manner, and the load may be indicated by one or more of: power consumption; radio resource consumption; and hardware load.

At operation 2, the source MN sends a node configuration update acknowledge message to the target SN.

At operation 3, the source MN makes a handover decision according to the cell auxiliary information included in the node configuration update message sent by the SN node. According to the predicted load information in the cell auxiliary information, the source MN selects a target cell on an SN by using a judgement criterion of selecting a target cell of which the predicted load is lower than a certain threshold, initiates an SN addition request (or modification), and hands over some designated users of the current serving cell to the target cell.

Through the description of the foregoing embodiments, a person having ordinary skill in the art can understand that the method according to the foregoing embodiments may be implemented by means of software plus a necessary universal hardware platform, and may also be implemented by hardware. The present disclosure can be embodied in the form of a software product. The computer software product may be stored in a storage medium (such as a ROM/RAM, a magnetic disk, and an optical disk), and may include multiple instructions for enabling a terminal device (which may be a mobile phone, a computer, a server, or a network device) to execute the methods described in the embodiments of the present disclosure.

The embodiments of the present disclosure also provide a computer-readable storage medium. The computer-readable storage medium stores a computer program. The computer program is configured to execute the operations in any one of the foregoing method embodiments at runtime.

In some exemplary implementations of the embodiments, the computer-readable storage medium may be configured to store a computer program for executing the following operations:

S1, receiving cell information of a second cell sent by a second network element, wherein the second cell is a cell managed by the second network element, and the cell information includes predicted cell load information of the second cell; and S2, sending a handover instruction to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold.

By means of the described operations, a first network element receives cell information of a second cell sent by a second network element, wherein the second cell is a cell managed by the second network element, and the cell information includes predicted cell load information of the second cell; and a handover instruction is sent to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold. Therefore, the problem in the related art that loads of cells are unbalanced and thus influence network services is solved, and the quality of the network services is improved.

Examples in this embodiment may refer to the examples described in the foregoing embodiments and exemplary implementations, and details are not repeatedly described herein in this embodiment.

In some exemplary implementations of the embodiments, the storage medium may include, but is not limited to, any medium that can store a computer program, such as a USB flash drive, a Read-Only Memory (ROM for short), a Random Access Memory (RAM for short), a removable hard disk, a magnetic disk, or an optical disc.

The embodiments of the present disclosure also provide an electronic device, including a memory and a processor, wherein the memory stores a computer program, and the processor is configured to run the computer program to execute the operations in any of the described method embodiments.

In some exemplary implementations, the electronic device may further include a transmission device and an input/output device, where the transmission device is connected to the processor, and the input/output device is connected to the processor.

In some exemplary implementations of the embodiments, the processor may be configured to execute the following operations by means of a computer program.

S1, receiving cell information of a second cell sent by a second network element, wherein the second cell is a cell managed by the second network element, and the cell information includes predicted cell load information of the second cell; and S2, sending a handover instruction to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold.

By means of the described operations, a first network element receives cell information of a second cell sent by a second network element, wherein the second cell is a cell managed by the second network element, and the cell information includes predicted cell load information of the second cell; and a handover instruction is sent to a terminal in a case where the cell information satisfies a preset condition, wherein the handover instruction is used for instructing the terminal to perform handover to the second cell, and the case where the cell information satisfies the preset condition at least indicates that the predicted cell load information of the second cell is lower than a configured first threshold. Therefore, the problem in the related art that loads of cells are unbalanced and thus influence network services is solved, and the quality of the network services is improved.

Examples in this embodiment may refer to the examples described in the foregoing embodiments and exemplary implementations, and details are not repeatedly described herein in this embodiment.

The embodiments of the present disclosure also provide a computer-readable storage medium. The computer-readable storage medium stores a computer program. The computer program is configured to execute the operations in any one of the foregoing method embodiments at runtime.

In some exemplary implementations of the embodiments, the computer-readable storage medium may be configured to store a computer program for executing the following operations:

S1, sending cell information of a second cell to a first network element, wherein the second cell is a cell managed by the second network element, the cell information includes predicted cell load information of the second cell, the cell information is used for instructing the first network element to send a handover instruction to a terminal in a case where the cell information satisfies a preset condition, the handover instruction is used for instructing the terminal to perform handover to the second cell, and the case where the cell information satisfies the preset condition at least indicates that the predicted cell load information of the second cell is lower than a configured first threshold.

By means of the described operations, a second network element sends cell information of a second cell to a first network element, wherein the second cell is a cell managed by the second network element, the cell information includes predicted cell load information of the second cell, the cell information is used for instructing the first network element to send a handover instruction to a terminal in a case where the cell information satisfies a preset condition, the handover instruction is used for instructing the terminal to perform handover to the second cell, and the case where the cell information satisfies the preset condition at least indicates that the predicted cell load information of the second cell is lower than a configured first threshold. Therefore, the problem in the related art that loads of cells are unbalanced and thus influence network services is solved, and the quality of the network services is improved.

Examples in this embodiment may refer to the examples described in the foregoing embodiments and exemplary implementations, and details are not repeatedly described herein in this embodiment.

In some exemplary implementations of the embodiments, the storage medium may include, but is not limited to, any medium that can store a computer program, such as a USB flash drive, a Read-Only Memory (ROM for short), a Random Access Memory (RAM for short), a removable hard disk, a magnetic disk, or an optical disc.

The embodiments of the present disclosure also provide an electronic device, including a memory and a processor, wherein the memory stores a computer program, and the processor is configured to run the computer program to execute the operations in any of the described method embodiments.

In some exemplary implementations, the electronic device may further include a transmission device and an input/output device, where the transmission device is connected to the processor, and the input/output device is connected to the processor.

In some exemplary implementations of the embodiments, the processor may be configured to execute the following operations by means of a computer program:

S1, sending cell information of a second cell to a first network element, wherein the second cell is a cell managed by the second network element, the cell information includes predicted cell load information of the second cell, the cell information is used for instructing the first network element to send a handover instruction to a terminal in a case where the cell information satisfies a preset condition, the handover instruction is used for instructing the terminal to perform handover to the second cell, and the case where the cell information satisfies the preset condition at least indicates that the predicted cell load information of the second cell is lower than a configured first threshold.

By means of the described operations, a second network element sends cell information of a second cell to a first network element, wherein the second cell is a cell managed by the second network element, the cell information includes predicted cell load information of the second cell, the cell information is used for instructing the first network element to send a handover instruction to a terminal in a case where the cell information satisfies a preset condition, the handover instruction is used for instructing the terminal to perform handover to the second cell, and the case where the cell information satisfies the preset condition at least indicates that the predicted cell load information of the second cell is lower than a configured first threshold. Therefore, the problem in the related art that loads of cells are unbalanced and thus influence network services is solved, and the quality of the network services is improved.

Examples in this embodiment may refer to the examples described in the foregoing embodiments and exemplary implementations, and details are not repeatedly described herein in this embodiment.

The embodiments of the present disclosure also provide a computer-readable storage medium. The computer-readable storage medium stores a computer program. The computer program is configured to execute the operations in any one of the foregoing method embodiments at runtime.

In some exemplary implementations of the embodiments, the computer-readable storage medium may be configured to store a computer program for executing the following operations:

S1, receiving a handover instruction sent by a first network element, wherein the handover instruction is sent by the first network element in a case where cell information satisfies a preset condition, the cell information is cell information of a second cell sent by a second network element, the second cell is a cell managed by the second network element, the cell information includes predicted cell load information of the second cell, and the case where the cell information satisfies the preset condition at least indicates that the predicted cell load information of the second cell is lower than a configured first threshold; and S2, performing handover to the second cell according to the handover instruction.

By means of the described operations, a terminal receives a handover instruction sent by a first network element, wherein the handover instruction is sent by the first network element in a case where cell information satisfies a preset condition, the cell information is cell information of a second cell sent by a second network element, the second cell is a cell managed by the second network element, the cell information includes predicted cell load information of the second cell, and the case where the cell information satisfies the preset condition at least indicates that the predicted cell load information of the second cell is lower than a configured first threshold; and the terminal switches to the second cell according to the handover instruction. The scheme solves the problem in the related art that loads of cells are unbalanced and thus influence network services, and improves the quality of the network services.

Examples in this embodiment may refer to the examples described in the foregoing embodiments and exemplary implementations, and details are not repeatedly described herein in this embodiment.

In some exemplary implementations of the embodiments, the storage medium may include, but is not limited to, any medium that can store a computer program, such as a USB flash drive, a Read-Only Memory (ROM for short), a Random Access Memory (RAM for short), a removable hard disk, a magnetic disk, or an optical disc.

The embodiments of the present disclosure also provide an electronic device, including a memory and a processor, wherein the memory stores a computer program, and the processor is configured to run the computer program to execute the operations in any of the described method embodiments.

In some exemplary implementations, the electronic device may further include a transmission device and an input/output device, where the transmission device is connected to the processor, and the input/output device is connected to the processor.

In some exemplary implementations of the embodiments, the processor may be configured to execute the following operations by means of a computer program.

S1, receiving a handover instruction sent by a first network element, wherein the handover instruction is sent by the first network element in a case where cell information satisfies a preset condition, the cell information is cell information of a second cell sent by a second network element, the second cell is a cell managed by the second network element, the cell information includes predicted cell load information of the second cell, and the case where the cell information satisfies the preset condition at least indicates that the predicted cell load information of the second cell is lower than a configured first threshold; and S2, performing handover to the second cell according to the handover instruction.

By means of the described operations, a terminal receives a handover instruction sent by a first network element, wherein the handover instruction is sent by the first network element in a case where cell information satisfies a preset condition, the cell information is cell information of a second cell sent by a second network element, the second cell is a cell managed by the second network element, the cell information includes predicted cell load information of the second cell, and the case where the cell information satisfies the preset condition at least indicates that the predicted cell load information of the second cell is lower than a configured first threshold; and the terminal switches to the second cell according to the handover instruction. The scheme solves the problem in the related art that loads of cells are unbalanced and thus influence network services, and improves the quality of the network services.

Examples in this embodiment may refer to the examples described in the foregoing embodiments and exemplary implementations, and details are not repeatedly described herein in this embodiment.

A person having ordinary skill in the art should understand that each module or each operation of the present disclosure may be implemented by a universal computing device, and the modules or operations may be concentrated on a single computing device or distributed on a network formed by multiple computing devices. Alternatively, the modules or operations may be implemented by program codes executable for the computing devices, so that the modules or operations may be stored in a storage device for execution with the computing devices. The shown or described operations may be executed in sequences different from those described here in some cases, or the modules or operations may be made into integrated circuit modules respectively, or multiple modules or operations therein may be made into a single integrated circuit module for implementation. As such, the present disclosure is not limited to any particular hardware and software combination.

What is claimed is:

1. A handover method performed by a first network element managing a first cell, comprising:
    receiving cell information of a second cell sent by a second network element, wherein the second cell is a cell managed by the second network element, the cell information comprises predicted cell load information of the second cell, and the predicted cell load information is used for indicating a predicted average load condition of the second cell within a specified time period after a current time; and
    sending a handover instruction to a terminal currently located in the first cell in a case where the cell information satisfies a preset condition, wherein the handover instruction is used for instructing the terminal to perform handover from the first cell to the second cell, and the case where the cell information satisfies the preset condition at least indicates that the predicted cell load information of the second cell is lower than a configured first threshold.

2. The method according to claim 1, before sending the handover instruction to the terminal, further comprising:
    determining that current cell load information of the first cell is higher than a configured second threshold; or,
    determining that the current cell load information of the first cell is lower than a configured third threshold.

3. The method according to claim 2, wherein after determining that the current cell load information of the first cell is lower than the configured third threshold, sending the handover instruction to the terminal in a case where the cell information satisfies the preset condition comprises:
    sending the handover instruction to the terminal in a case where the cell information satisfies the preset condition, wherein the case where the cell information satisfies the preset condition further indicates that the second cell and the first cell have the same coverage, the cell information further comprises cell coverage information, and the cell coverage information is used for indicating an overlapped coverage relationship between the second cell and the first cell.

4. The method according to claim 3, after the terminal performs handover to the second cell, further comprising:
    switching off the first cell.

5. The method according to claim 4, wherein switching off the first cell comprises at least one of:
    switching off the entire first cell, switching off all or part of carriers of the first cell, switching off all or part of radio frequency channels of the first cell, and switching off all or part of symbol resources of the first cell.

6. The method according to claim 1, wherein the predicted cell load information comprises at least one of cell power consumption, cell radio resource consumption, cell hardware load, and cell beam load.

7. The method according to claim 1, before receiving the cell information sent by the second network element, further comprising:
    sending a request message to the second network element, wherein the request message carries a report indicator, and the report indicator is used for instructing the second network element to send the cell information.

8. The method according to claim 1, wherein the handover instruction is radio resource control signaling.

9. A handover device, comprising: a memory and a processor, wherein the memory stores a computer program; the processor is configured to run the computer program to execute the method according to claim 1.

10. A handover device, comprising: a memory and a processor, wherein the memory stores a computer program; the processor is configured to run the computer program to execute the method according to claim 9.

11. A non-transitory computer-readable storage medium storing a computer program, wherein the computer program is configured to execute the method according to claim 1 at runtime.

12. A non-transitory computer-readable storage medium storing a computer program, wherein the computer program is configured to execute the method according to claim 9 at runtime.

13. A handover method performed by a second network element, comprising:
sending cell information of a second cell to a first network element managing a first cell, wherein the second cell is a cell managed by the second network element, the cell information comprises predicted cell load information of the second cell, the predicted cell load information is used for indicating a predicted average load condition of the second cell within a specified time period after a current time, the cell information is used for instructing the first network element to send a handover instruction to a terminal currently located in the first cell in a case where the cell information satisfies a preset condition, the handover instruction is used for instructing the terminal to perform handover from the first cell to the second cell, and the case where the cell information satisfies the preset condition at least indicates that the predicted cell load information of the second cell is lower than a configured first threshold.

14. The method according to claim 13, wherein the cell information is further used for instructing the first network element to determine, before sending the handover instruction to the terminal, that current cell load information of the first cell is higher than a configured second threshold; or,
the cell information is further used for instructing the first network element to determine, before sending the handover instruction to the terminal, that the current cell load information of the first cell is lower than a configured third threshold.

15. The method according to claim 14, wherein the cell information is further used for instructing the first network element to send the handover instruction to the terminal in a case where the cell information satisfies the preset condition after determining that the current cell load information of the first cell is lower than the configured third threshold, and the case where the cell information satisfies the preset condition further indicates that the second cell and the first cell have the same coverage, the cell information further comprises cell coverage information, and the cell coverage information is used for indicating an overlapped coverage relationship between the second cell and the first cell.

16. The method according to claim 15, wherein the cell information is further used for instructing the first network element to switch off the first cell after sending the handover instruction to the terminal.

17. The method according to claim 13, before sending the cell information of the second cell to the first network element, further comprising:
receiving a request message sent by the first network element, wherein the request message carries a report indicator, and the report indicator is used for instructing the second network element to send the cell information.

18. A handover device, comprising: a memory and a processor, wherein the memory stores a computer program; the processor is configured to run the computer program to execute the method according to claim 13.

19. A non-transitory computer-readable storage medium storing a computer program, wherein the computer program is configured to execute the method according to claim 13 at runtime.

20. A handover method performed by a terminal currently located in a first cell, comprising:
receiving a handover instruction sent by a first network element managing the first cell, wherein the handover instruction is sent by the first network element in a case where cell information satisfies a preset condition, the cell information is cell information of a second cell sent by a second network element, the second cell is a cell managed by the second network element, the cell information comprises predicted cell load information of the second cell, the predicted cell load information is used for indicating a predicted average load condition of the second cell within a specified time period after a current time, and the case where the cell information satisfies the preset condition at least indicates that the predicted cell load information of the second cell is lower than a configured first threshold; and
performing handover from the first cell to the second cell according to the handover instruction.

* * * * *